United States Patent Office 2,791,573
Patented May 7, 1957

2,791,573

RESINOUS MOLDING COMPOSITION AND PROCESS FOR PRODUCING SAME

Howard T. Bangs, North Plainfield, N. J., and Raymond A. Mazur, Suffield, Conn., assignors to American Cyanamid Company, New York, N. Y., a corporation of Maine No Drawing. Application March 12, 1954,
Serial No. 415,954

6 Claims. (Cl. 260—45.2)

This invention relates to the production of aminoplastic resinous molding compositions. More particularly this invention relates to aminoplastic resinous molding compositions which, when cured under standard conditions, yield a special optical effect to the article produced. Further, this invention relates to the production of the aminoplastic resinous molding compositions, the compositions produced and the articles prepared therefrom.

The aminoplastic resinous compositions with which our invention is concerned are synthetic resins derived from amino (including imino) or amido (including imido) compounds. The present invention is concerned particularly with the aminoplastics which are products of reaction of ingredients comprising an aldehyde, e. g., formaldehyde, and a monomeric amidogen compound containing not less than two (e. g., two, three, four or any number, but preferably only two or three) amidogen groupings each having at least one hydrogen atom (preferably two hydrogen atoms) attached to the amidogen nitrogen atom. Amidogen compounds as used herein and in the appended claims have reference to an amino or an amido compound and more particularly to such a compound (unless otherwise stated) which contains not less than two amidogen groupings each having at least one hydrogen atom attached to the amidogen nitrogen atom. Urea and melamine are typical examples of amidogen compounds.

These aminoplastic resins are heat-curable and are characterized by their outstanding resistance to heat, excellent electrical properties and by their low water absorption properties. Molding compositions prepared from these resinous compositions find many uses, particularly in the production of tableware and the like. Prior to our invention it was customary to prepare a molding composition of uniform color. Obviously, when such a material is cured to an infusible and insoluble state, the article prepared is also uniform in color. Attempts have been made to produce molding compositions having a plurality of colors thereby forming an object having certain special optical effects. While molding compositions containing dyes, pigments and other colorants have been blended to form a multicolored molding composition, the article prepared from such a composition yields a striated or nonuniform blend of the various colors in the cured object.

It is an object of our invention to produce an aminoplastic resinous molding composition which may be molded under standard conditions to yield a special optical effect. It is a further object of our invention to prepare a heat-curable aminoplastic resin which when cured produces a random mottled or spotted effect and wherein the colors present are not striated. These and other objects of our invention will be discussed more fully hereinbelow.

We have now found that a heat-curable aminoplastic resinous molding composition may be produced which when cured under standard operating conditions presents a special optical effect which was not obtainable prior to our invention. We have found that, by blending aminoplastic resinous compositions possessing definite plasticities or flow characteristics, a molding composition may be obtained which when cured yields a spottled or mottled effect in the object produced. The colors present in the molded object do not run together or striate. In the preparation of the molding composition of our invention one of the aminoplastics possesses a high plasticity or a stiff flowing characteristic. The other component of the molding composition possesses a low plasticity or a soft flowing characteristic. After the components of the molding composition are blended, the material may be heat-cured under standard conditions to produce an object possessing the special optical effect. The aminoplastics possessing the high plasticity or stiff flowing characteristics should have a plasticity as determined by the flow-mold-flow test within the range of from about 0.045 to about 0.065 inch. The components possessing the low plasticity or soft flow characteristics should have a plasticity within the range of from about 0.030 to about 0.036 inch. The manner in which the plasticity of the material is determined by the flow-mold-flow test will be set forth in more detail below. While the plasticity of the components of the molding composition as established by the flow-mold-flow test is the preferred method of defining the characteristics of the components of the composition, another method which may be employed is by the determination of the tons pressure required to close a mold containing a fixed amount of the material under specific curing conditions. By this method a stiff flowing material requires a pressure within the range of from about 22 tons up to about 30 tons pressure to close the mold. Preferably the tons pressure to close the mold should be greater than 30. The tons pressure required to close the mold on the soft flowing component of the material should be within the range of from about 16 to about 22 tons. As is well known, the plasticity of a molding composition is that property which determines its rate of deformation under standard conditions. After the plasticity of the aminoplastic resinous molding composition has been determined, it is then blended with another aminoplastic resinous molding composition of different plasticity. In order to obtain the special optical effect of our invention, it is necessary that the aminoplastics blended possess plasticity within the ranges set forth above. If the plasticity ranges of the resinous materials that are blended are not within the range set forth above, the spottled or mottled effect is not obtainable but rather a striated effect is obtained. Various methods are familiar to those skilled in the art by which a molding composition of a desired plasticity may be obtained. For instance, the resin filler ratio of the composition may be changed to effect a change in the plasticity. It is also possible to react a material to a degree of polymerization which is still water-soluble but which, when dried in the equipment standard to the trade, will give a desired plasticity. By limiting the degree of reaction of the components of the resinous material, a composition of low plasticity may be obtained. It is also possible to effect the desired plasticity of the molding composition by the addition of various plasticizers to the composition. In any event, it is necessary that the plasticity of the components of the molding composition possess plasticizers within the ranges set forth above in order to obtain the special optical effect of our invention.

The values referred to hereinabove with respect to plasticity are determined according to the following tests. A charge of 60 grams of the molding composition at 20-30° C. is placed in the center of the bottom platen of a molding press. Both platens are at a temperature of 290±2° F. and are so shaped and grooved as to produce a flat molded disk with concentric rings ½ inch apart. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disk is recorded in mils or inches as the measure of the plasticity. For convenience, this testing of the plasticity or the flow characteristics of the resin will be referred to as the flow-mold-flow test. As stated previously, the desired plasticity of the stiff flowing component of the molding composition is within the order of about 0.045 to 0.065 inch or 45 to 65 mils and that of the soft flowing material is within the order of about 0.030 to about 0.036 inch or 30 to 36 mils.

In order to obtain a molding composition of desired color, dyes, pigments or other colorants may be incorporated therein. The final color of the composition may be obtained by carefully selecting the pigments, the metallic powders and/or dyes introduced therein. Illustrative examples of colorants that may be introduced into the mixture are such as cadmium yellow, cadmium red, cadmium maroon, titanium oxide, black iron oxide, chrome green, gold, silver, aluminum and copper. Suitable dyes are such as alizarine red, Prussian blue, auramin naphthol, malachite green and the like. The amount of the colorants present in the molding composition may be varied depending upon the depths and shades of color desired. When a dark rich color is desired, colorants in an amount up to about 20% by weight may be employed. Generally, from about 0.5% to about 15% by weight of the colorants yields a satisfactory color to the molding composition. Obviously, when it is desired that one component of the molding composition be noncolored, no colorants will be introduced therein. The colorants may be introduced into the molding composition in any manner well known in the art. The aminoplastic resins blended together to form the molding composition of our invention may be of the same color or they may be of different colors.

In order that those skilled in the art may more fully understand the inventive concept herein presented, the following examples are given by way of illustration and not limitation unless otherwise noted in the appended claims.

*Example 1*

Component A of the molding composition was prepared by impregnating alpha-cellulose pulp with a melamine-formaldehyde resinous syrup wherein the ratio of melamine to formaldehyde was 1:2, respectively. The material was then dried to a volatile content of 4.8% and then reduced to particle size in a ball mill with catalysts, lubricants and colorants. This material had a plasticity of 0.055–0.060 inch and required 30 tons pressure to close the mold.

Component B of the composition was similar to component A except that its production was controlled to yield a plasticity of 0.030–0.036 inch and required 16 tons pressure to close the mold.

15% of component A was then blended with 85% of component B and the molding composition was then cured under standard conditions. A tumbler molded from the composition presented a cured object wherein the material had a spotted optical effect. The components of the mixture did not striate during the cure of the composition.

*Example 2*

In the preceding example component A and component B of the molding composition were of the same color. In this example a different colorant was added to component A in order to obtain a differently colored material. 15% of component A was then physically blended with 85% of component B as produced in the preceding example and the composition then cured. In the article produced, the spotted or mottled effect presented a most striking appearance due to the different colors of the components of the composition. No striating of the colors was apparent.

*Example 3*

A urea-formaldehyde molding composition was prepared containing 1.33 mols of formaldehyde for each mol of urea. White pine wood flour was employed as the filler in the composition. Component A of the molding composition was dried and ball milled with catalysts, lubricants and colorants to yield a molding composition having a plasticity of 0.045–0.054 inch and required 22–28 tons pressure to close the mold.

Component B of the molding composition was similar to component A except that in its production the reaction was controlled to yield a material having a plasticity of 0.030–0.036 inch and required 17–22 tons pressure to close the mold.

20% of component A was then blended with 80% of component B and the molding composition then cured under standard conditions. A dinner plate molded from the composition presented a spotted optical effect and no striating of the colors in the plate was obvious.

*Example 4*

In this example a different colorant was introduced into component B during its preparation. The plasticity of the components was the same as in the preceding example. When buttons were prepared using a blend of the components as in the preceding example, the objects possessed the special optical effect wherein a spotted appearance was obtained.

The amount of the components blended together to form the final aminoplastic molding composition may be varied within a rather wide range and may be varied to yield any desired effect. Thus, from about 5% to about 95% by weight of the molding composition may constitute the resinous material possessing a high plasticity or stiff flow characteristic. However, it is generally preferred that the high plasticity or stiff flowing component of the total molding composition be within the order of from about 10% to about 20% by weight based on the total weight. The low plasticity or soft flowing material will accordingly constitute a preferred amount of from about 20% to about 80% by weight based on the total aminoplastic resinous molding composition.

Our invention is operative with reaction products of an aldehyde, specifically formaldehyde, and any monomeric amidogen compound containing at least two aldehyde-reactable amino or amido groupings, that is to say, any monomeric amidogen compound containing at least two amidogen groupings each having at least one hydrogen atom (preferably two hydrogen atoms) attached to the amidogen nitrogen atom.

Any suitable aldehyde may be employed as a reactant with the amidogen compound in producing an aldehyde-reaction product thereof. We prefer to use formaldehyde, e. g., aqueous solutions of formaldehyde. Paraformaldehyde, hexamethylenetetramine, or other compounds engendering formaldehyde also may be employed. In certain cases other aldehydes, e. g., acetaldehyde, propionaldehyde, butyraldehyde, acrolein, methacrolein, crotonaldehyde, octaldehyde, benzaldehyde, furfural, mixtures thereof, or mixtures of formaldehyde (or compounds engendering formaldehyde) with such other aldehyde or aldehydes, may be employed. The choice of the aldehyde is dependent upon such factors as, for instance, the particular properties desired in the finished product and economic considerations.

As amidogen-aldehyde aminoplastics, I prefer to use heat-curable or potentially heat-curable resinous reaction products of ingredients comprising a polyaminotriazine (e. g., melamine) and formaldehyde, or comprising urea, melamine (or other polyaminotriazine) and formaldehyde. However, heat-curable or potentially heat-curable urea-formaldehyde, thiourea-formaldehyde and thiourea-melamineformaldehyde resinous reaction products also may be employed. Dimethylol urea, alkyl ethers thereof, polymethylol melamines (more particularly mono-, di-, tri-, tetra-, penta- and hexamethylol melamines) and alkyl ethers thereof may be used. Examples of other amidogen compounds which may be reacted with an aldehyde to provide the products which are blended in accordance with the present invention are: methylurea, phenylurea, phenylthiourea, allylurea, guanylurea, guanylthiourea, dicyandiamide, guanidine, biguanide, diaminodiazines, guanazole and other diaminotriazoles, ammeline, etc. Numerous examples of aldehydes that may be reacted with the amidogen compound have been mentioned hereinbefore. These amidogen-aldehyde aminoplastics are prepared, in general, in accordance with techniques well known to the art. The molar ratio of aldehyde to amidogen compound, depending, for instance, upon the particular amidogen compound employed, may vary, for example, from 0.35 to 2.0 mols thereof for each aldehyde-reactable amidogen grouping in the amidogen compound, preferably 1 mol of aldehyde per each aldehyde-reactable amidogen grouping.

In the preparation of the molding compositions of our invention it is customary to employ fillers therein. Illustrative examples of fillers that may be incorporated are alpha-cellulose, wood flour, walnut shell flour, calcined or natural asbestos in the form of a powder or short or long fibers, finely divided silicon carbide, carbon black, graphite, diatomaceous earth, slate dust, powdered rutile, powdered or flake mica, powdered quartz, powdered glass, cloth cuttings (e. g., cuttings of silk, rayon, wool, linen, cotton, nylon, or of cloth made from glass fibers or from polymeric or copolymeric acrylonitrile fibers, etc.), ground cork, sand, etc. The proportions of filler present may be varied as desired or as conditions may require. Thus, depending upon the particular filler employed and the intended use of the molding article, the filler may constitute, for example, from 5% to 80% by weight of the molding composition. It is apparent that no filler need be present in certain applications.

In certain instances curing agents such as phthalic anhydride, p-toluene sulfonic acid, phthalic acid, benzoyl peroxide and the like may also be incorporated into the aminoplastic resinous molding composition. Mold lubricants may also be incorporated into the composition if needed to facilitate molding of the heat-curable convertible composition. Examples of suitable mold lubricants are such as zinc stearate, calcium stearate, glycerol monostearate and the like. These additives will be incorporated into the molding compositions in proportions well known in the art and also in those proportions that are required to produce certain desired molding characteristics.

The resinous compositions of our invention may be shaped or formed as by compression molding, transfer molding, etc. A temperature range, for example, from about 130°–170° C. and pressures varying from about 1000 to about 20,000 pounds or more per square inch may be employed during the cure of the resinous composition to an insoluble and infusible state.

What is claimed is:

1. A process for producing molded articles having a variegated effect which comprises blending a dried, particulate, heat-curable aminoplast resinous composition having a plasticity of from about 0.045 to about 0.065 inch and a differently colored, dried, particulate, heat-curable aminoplast resinous composition having a plasticity of from about 0.030 to about 0.036 inch, said aminoplast resinous composition being prepared by reacting an aldehyde with a compound selected from the group consisting of melamine, urea, methylurea, phenylurea, thiourea, phenylthiourea, allylurea, guanylurea, guanylthiourea, dicyandiamide, guanidine, biguanide, guanazole and ammeline and curing said blended composition under sufficient heat and pressure to an insoluble and infusible state.

2. A process for producing molded articles having a variegated effect which comprises blending a dried, particulate, heat-curable melamine-formaldehyde resinous composition having a plasticity of from about 0.045 to about 0.065 inch and a differently colored, dried, particulate, heat-curable melamine-formaldehyde resinous composition having a plasticity of from about 0.030 to about 0.036 inch and curing said blended composition under sufficient heat and pressure to an insoluble and infusible state.

3. A process for producing molded articles having a variegated effect which comprises blending a dried, particulate, heat-curable urea-formaldehyde resinous composition having a plasticity of from about 0.045 to about 0.065 inch and a differently colored, dried, particulate, heat-curable urea-formaldehyde resinous composition having a plasticity of from about 0.030 to about 0.036 inch and curing said blended composition under sufficient heat and pressure to an insoluble and infusible state.

4. A molding composition for producing molded articles having a variegated effect comprising a blend of a dried, particulate, heat-curable aminoplast resinous composition having a plasticity of from about 0.045 to about 0.065 inch and a differently colored, dried, particulate, heat-curable aminoplast resinous composition having a plasticity of from about 0.030 to about 0.036 inch, said aminoplast resinous compositions being prepared by reacting an aldehyde with a compound selected from the group consisting of melamine, urea, methylurea, phenylurea, thiourea, phenylthiourea, allylurea, guanylurea, guanylthiourea, dicyandiamide, guanidine, biguanide, guanazole and ammeline.

5. A molding composition for producing molded articles having a variegated effect comprising a blend of a dried, particulate, heat-curable melamine-formaldehyde resinous composition having a plasticity of from about 0.045 to about 0.065 inch and a differently colored, dried, particulate, heat-curable melamine-formaldehyde resinous composition having a plasticity of from about 0.030 to about 0.036 inch.

6. A molding composition for producing molded articles having a variegated effect comprising a dried, particulate, heat-curable urea-formaldehyde resinous composition having a plasticity of from about 0.045 to about 0.065 inch and a differently colored, dried, particulate, heat-curable urea-formaldehyde resinous composition having a plasticity of from about 0.030 to about 0.036 inch.

References Cited in the file of this patent

UNITED STATES PATENTS

| | | |
|---|---|---|
| 1,998,539 | Jams et al. | Apr. 23, 1935 |
| 2,369,371 | Seiberlich | Feb. 13, 1945 |
| 2,388,293 | Schroy et al. | Nov. 6, 1945 |
| 2,447,621 | Smidth | Aug. 24, 1948 |
| 2,466,040 | Myerson | Apr. 5, 1949 |

FOREIGN PATENTS

| | | |
|---|---|---|
| 627,661 | Great Britain | Aug. 12, 1949 |

OTHER REFERENCES

Hackh: Chemical Dictionary, 2nd edition (1937), page 47.